United States Patent [19]

Hardee

[11] 4,423,651

[45] Jan. 3, 1984

[54] BAR FEED CENTRICALLY GUIDING DEVICE FOR LATHE APPARATUS

[75] Inventor: Eldred V. Hardee, Loris, S.C.

[73] Assignee: Hardee Manufacturing Company, Inc., Loris, S.C.

[21] Appl. No.: 246,981

[22] Filed: Mar. 24, 1981

[51] Int. Cl.³ .............................................. B23B 13/00
[52] U.S. Cl. ......................................... 82/2.5; 82/2.7; 82/33 R; 82/38 A; 414/17; 414/18
[58] Field of Search .............. 82/2.5, 2.7, 38 R, 38 A, 82/33 R, 33 A; 414/15, 17, 18, 20, 14

[56] References Cited

U.S. PATENT DOCUMENTS

| | | | |
|---|---|---|---|
| 2,463,385 | 3/1949 | Holohan | 82/33 R |
| 2,572,741 | 10/1951 | McCoy | |
| 2,793,041 | 5/1957 | Barbier et al. | 82/33 A |
| 3,070,239 | 12/1962 | Lanphere | 414/18 |
| 3,985,221 | 10/1976 | Lueders | 82/2.7 |
| 4,068,545 | 1/1978 | Scheler | 82/2.5 |

Primary Examiner—Robert E. Garrett
Assistant Examiner—Jerry Kearns
Attorney, Agent, or Firm—Edwin E. Greigg

[57] ABSTRACT

A hydraulically operated bar stock feeder having a hydraulic circuit in which a hydraulic pump drives a hydraulic motor which in turn operates the bar feeder carriage. The hydraulic pump operates a hydraulic cylinder with a designed live center cup attached to the end of the cylinder rod. The hydraulic circuit has a control valve with hydraulic detent which will lock in a forward or backward position. While the control valve is locked in forward position, fluid is allowed to go to a relief valve at the hydraulic motor on the carriage. The relief valve reduces the pressure going to hydraulic motor and deceleration valve. When the carriage reaches the end of track the deceleration valve is depressed, which, through another relief valve at a lower pressure starts the cylinder rod moving outward. Both the cylinder and carriage motor are able to set (not move) under pressure and will start automatically when the lathe chuck is open. When the cylinder is fully extended, then the work piece will be used up; thus to return the system to an initial starting condition, manually reverse the hydraulic valve and the cylinder rod will retract and also the hydraulic motor will retract to a normal starting position. The live center with its unique cup design works in conjunction with an interlocking retainer shield. This design maintains centricity eliminating bar stock vibration when lathe chuck is turning. As the bar stock length decreases to a point allowing a shield sleeve to come in contact with the lathe tube, the shield automatically stops, the live center continues into the lathe tube with the bar stock. The live center cup expands automatically when entering the lathe tube maintaining centricity of the bar stock.

8 Claims, 6 Drawing Figures

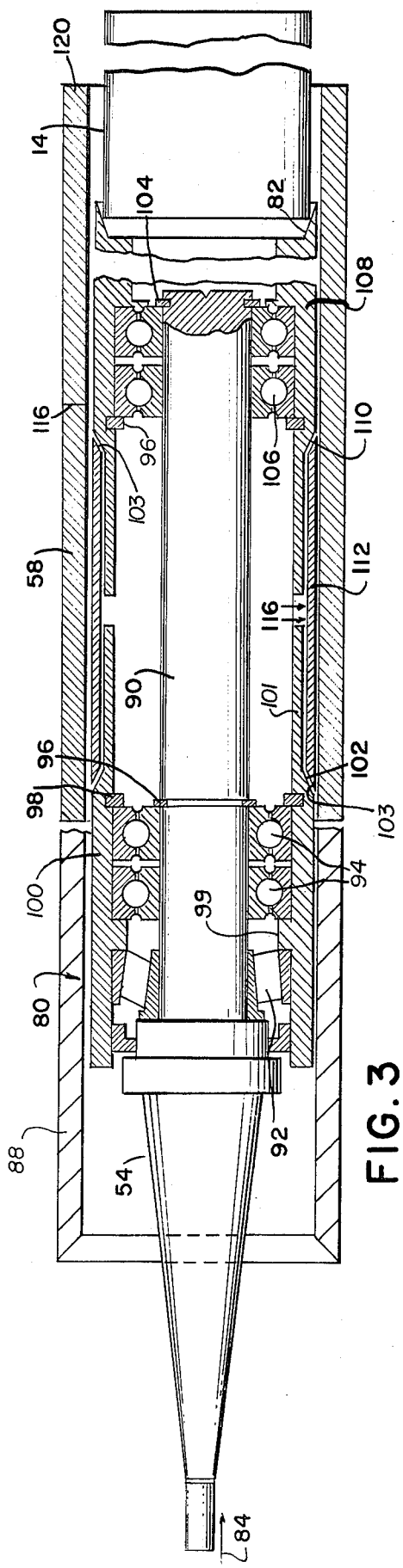
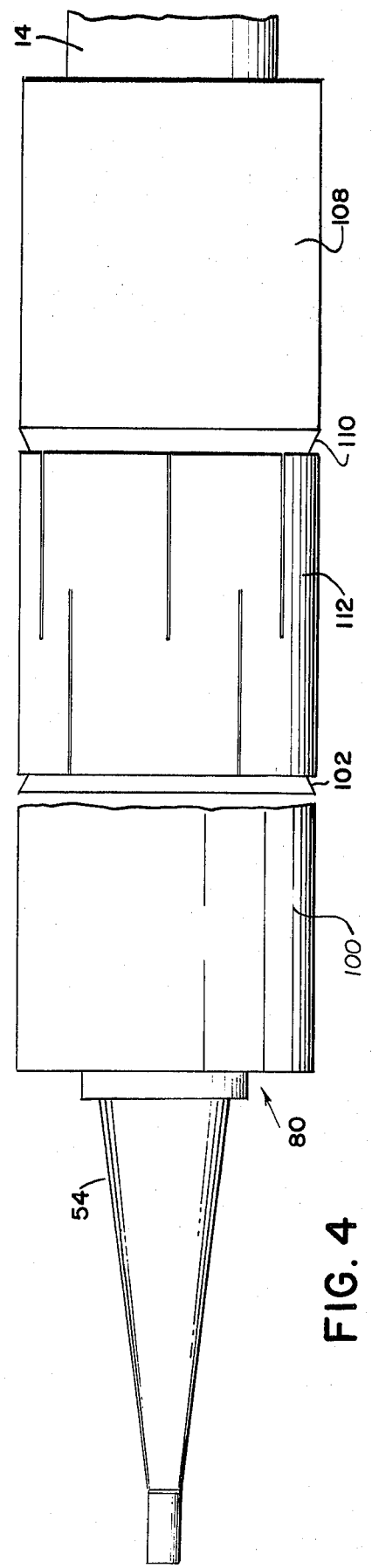
FIG. 3
FIG. 4

BAR FEED CENTRICALLY GUIDING DEVICE FOR LATHE APPARATUS

BRIEF SUMMARY OF THE INVENTION

The invention relates to a new support means for a rotating bar stock in which, with increasing speed of rotation of the bar stock, the axial forces increase and cause the bar to revolve centrally about its axis; more particularly the invention relates to mechanically feeding round, square or hex bar stock or tubing to lathes and other metal cutting machines by mechanical support means for centrically supporting the bar stock while it is rotating and loaded into the bar feed.

The invention further relates also to a hydraulic carriage loader mechanism to lift the bar stock to refill the support means.

The invention specifically relates to an apparatus and method to provide a hydraulic circuit controlled bar feeder having a centrically coupled element for reducing wobble and eccentric movements of rotating bar stock and which will allow the hydraulic circuit controlled bar feeder to keep constant pressure and maintain centricity on the bar stock being machined; also mechanisms are provided to reload the bar stock by means of a hydraulic carriage loader.

BACKGROUND OF THE INVENTION

There has long been felt a need to provide mechanical means to apply constant pressure on bar stock being machined and to maintain centricity of rotation of the bar stock as it rotates or revolves around its own axis.

Much of the prior art which uses live centers relates to reducing vibrations caused by rotation of bar stock, but the problem increases with added lengths of bar stock and higher speeds of rotation such as 2,000 to 3,000 rpm or higher.

OBJECTS AND SUMMARY OF THE INVENTION

It is an object of the present invention to provide an improved bar feed device or apparatus having a mechanical arrangement for centrically guided rotating bar stock during rotation about its own axis to greatly improve the overall quality of machining to which the centrically guided device is applied.

It is a further object of the invention to provide a device in which the rpm of a lathe spindle can be significantly increased as a result of the centrically guiding device used with the hydraulic dynamic bar feed system.

A further object of the invention is to provide efficiency in clamping of the bar stock by the lathe chuck, which efficiency is increased as a result of maintaining a relatively constant centricity of a guiding device applied to support one end of the bar stock.

A further and additional advantage of the invention is that constantly or generally maintained centricity provides for elimination of "push-back" caused by pressure of the lathe cutting tools due to design of the bar feed.

Further advantages of the invention provide an increased accuracy in feeding of the bar stock into the lathe; longer life of cutters used on the bar stock which is a factor dependent on end wobble of the bar stock distal of the chuck; greater quality control is maintained as a result of the bar stock being stopped at a pre-determined length; elimination of work pieces of length variations which greatly reduces loss of bar stock material; and there is provided a centrically guiding device universally adaptable to many makes of lathes which use long bar stock feeds or intermediate lengths of bar stock feed, rather than being adaptable to one or a few lathe apparatus or systems designs.

BRIEF DESCRIPTION OF THE SEVERAL DRAWINGS

The above and other objects and advantages of the invention will become apparent upon full consideration of the following detailed description and accompanying drawings in which:

FIG. 3 is a cross-sectional view of the improved live center comprising the details of the centrically guiding device illustrated relative to a retainer shield and a bar stock tube of a lathe;

FIG. 4 is a side elevation view of the line center;

DETAILED DESCRIPTION OF THE PREFERRED EMBODIMENT OF THE INVENTION

Figure 1:
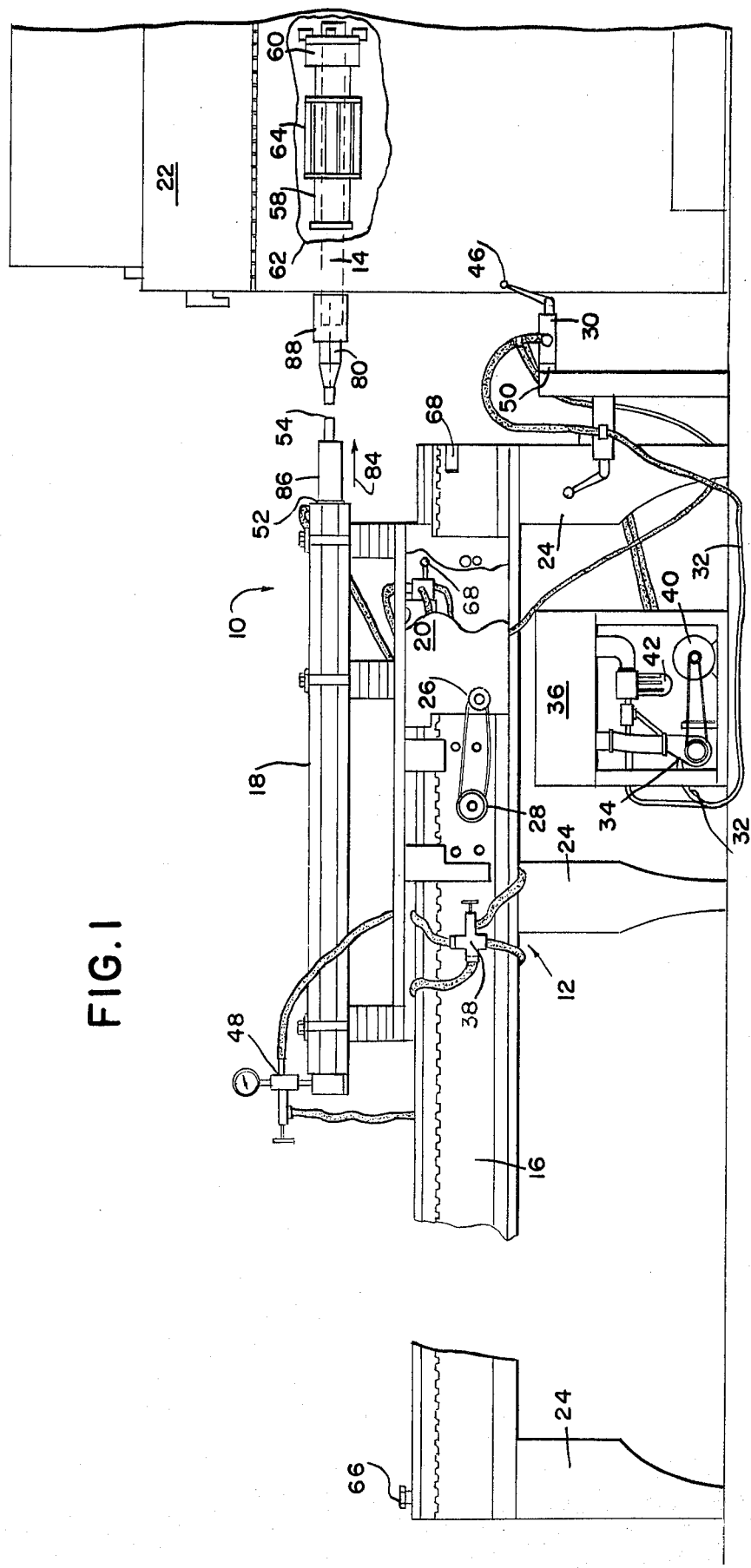
FIG. 1 is a schematic layout view of a bar feeder apparatus embodying a centrically guiding device for a cutter or lathe according to a preferred embodiment and best mode of the present invention.

Referring now to the drawings there is shown an automatic bar feeder and machine lathe apparatus 10 having a hydraulic drive system 12 for bar stock 14, a carriage bed 16 supporting a hydraulic drive cylinder mechanism 18 which is driven by bed driving hydraulic apparatus 20, and a machine lathe 22 such as are commercially available.

The carriage bed is supported by leg members 24, 24, 24 in a well known manner from a level surface as is the machine lathe 22. The bed driving hydraulic apparatus 20 includes a drive member 26 driven by a hydraulic motor 28 which in turn is controlled by control valve mechanism 30 supplied by hydraulic lines 32, 32 from a pump 34 and a supply reservoir or tank 36. An electric motor 40 drives the pump 34. A filter 42 is interposed in between the line 32 and the tank 36 as shown. The hydraulic control valve 30 is locked in the forward position by means of a hydraulic detent 50. While the control valve is locked in its forward position, fluid is allowed to go to relief valve 38 at hydraulic motor 28 on the carriage 20. The relief valve 38 reduces or lowers the pressure going to hydraulic motor 28 and deceleration valve 68. When carriage 20 reaches the end of the track 16, the decleration valve 68 is depressed which through another relief valve 48 at a lower pressure starts the cylinder rod 54 moving outward. Both the cylinder 52 and carriage motor 28 are able to set (not move) under pressure and will start automatically when lathe chuck 60 is open. When the cylinder 52 is fully extended then the work piece 14 will be used up, thus to return system, manually reverse the hydraulic valve 30 and the cylinder rod 54 will retract and also the hydraulic motor 28 will retract to the normal starting position.

The machine lathe 22 includes a rotatable bar stock tube 58 and a chuck 60 shown within an inset 62 of the machine lathe. Also there are drive means for the chuck (not shown) and a hydraulic piston 64 to drive or function to open and close and otherwise control the chuck 60 in any conventional manner.

Figure 2:
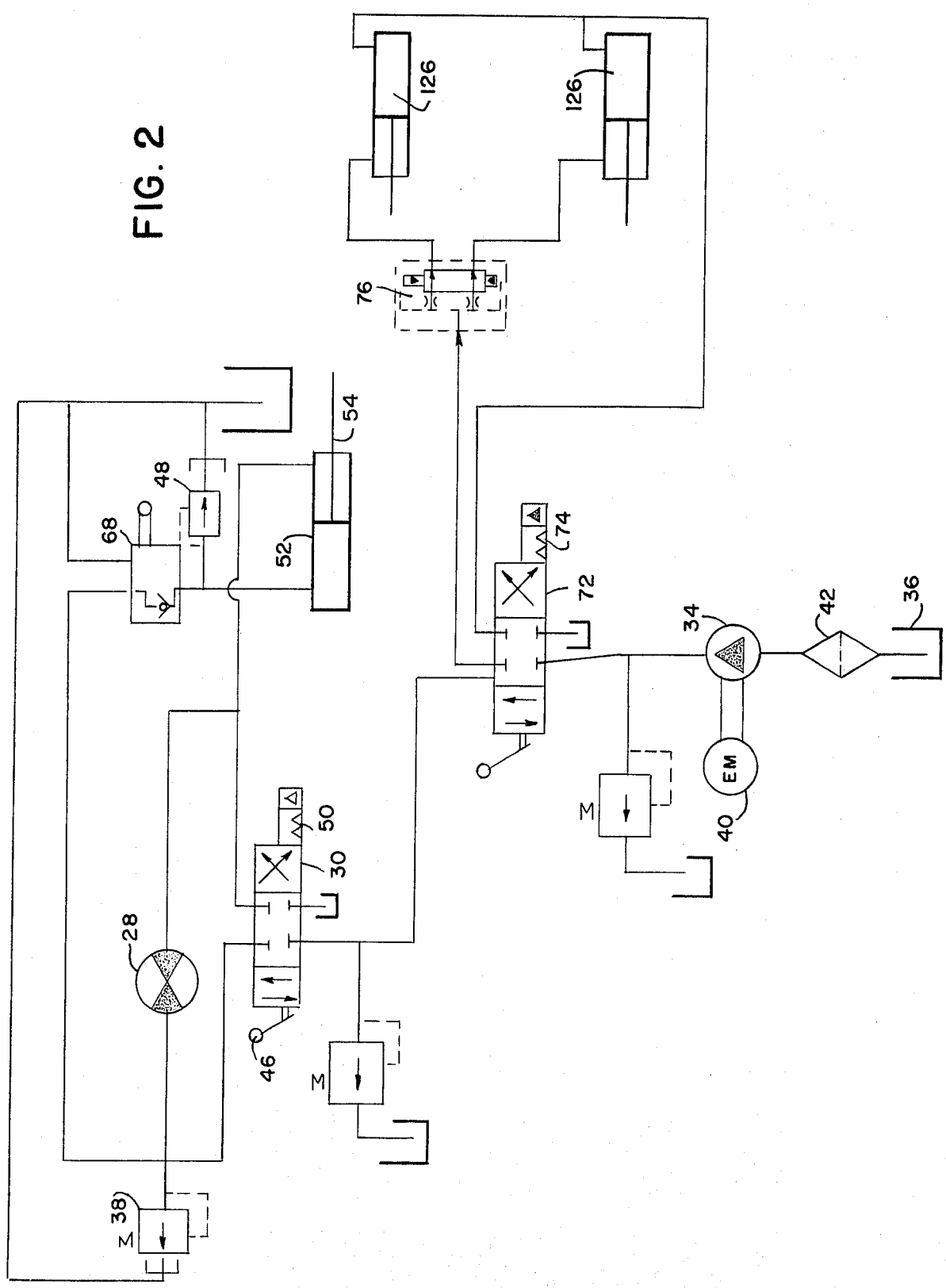
FIG. 2 is a schematic diagram of the hydraulic system of FIG. 1.

FIGS. 1 and 2 show the pump 34, detent mechanism 50, carriage motor 28, all comprising the hydraulic system and including further a carriage stop 66 and deceleration valve 68.

There is shown in FIGS. 3 and 4 details of a centrically guiding line center device 80 disposed on an end of cylinder rod 54 shown in relationship with the bar stock tube 58. The live center device 80 is shown with a female live center 82.

The female live center end cup 82 receives one end of bar stock 14 as pressure is supplied by the hydraulic drive cylinder mechanism 18 of FIGS. 1 and 2 as shown by arrow 84.

A safety shield 86 is supported from cylinder 52 of the carriage bed while a retainer shield surrounds the live center 80 and forms a safety shield for the bar feed mechanism. In FIG. 3, the retainer shield 88 and the bar stock tube 58 is shown relative to the device 80 such as when the rod 14 has been moved sufficiently for the bar stock feed mechanism to be extended into the bar stock tube 58. On a shaft 90 which is an extension of rod 54 to provide a support for the bar stock feed mechanism including the live center device 80. Supported on the shaft 90 is a tapered thrust ball bearing assembly 92, and a set of ball bearings 94 and stops or lock rings 96, 98, one lock ring engaging the shaft 90 and the other engaging a live center sleeve 100 supported by the bearings 92 and 94 and prevented from axial movement by the shoulder 99 and the lock rings 96 and 98. The live center sleeve 100 is provided with an outer conical slope surface 102 along its outer surface which slopes to an end extension 101 of lesser diameter. At the opposite end of the shaft 90 is a lock ring 104 on the stationary shaft 90, for holding a set of ball bearings 106 supporting in rolling or rotary engagement a live center sleeve of cup 108 and it having similarly an outer conical slope surface 110. The ball bearings 106 are free to move relative to shaft 90 and are held in place relative to end cup 108 by a ring 96. Since the ball bearings 106 are secured in place relative to end cup 108 and are movable relative to shaft 90, the end cup 108 will move toward live center sleeve 100 due to pressure on live center sleeve 100 and end cup 108.

Surroundingly encompassing a cylindrical spacing between the outer conical slope surfaces 102, 110 is an expandable section end pressure responsive ring 112 having a generally trapezoidal cross-section since it has sloping ends 103 similar to sloping surfaces 102 and 110 as shown in FIGS. 3 and 4 and which upon response to said end pressures afforded by force of arrow 84, the sloped ends of the pressure responsive ring 112 are caused to buckle outwardly as represented by arrows 116 so that it forms a locking function between sleeve 100 on one end, and with cup 108 on the opposite end of expandible ring 112. The ring may comprise an endless zigzag or Z-shaped construction as shown.

The rotatable bar stock sleeve 58 may extend to an end point 116 or all the way to an end 120. By means and function of the line center device 80 being activated by force shown by arrow 84, guidance of the rotating bar stock 14 by the live center device 80 tends to center the bar stock upon its axis while passing through the chuck 60 and results in elimination of wobble of the bar stock at the portion of the bar stock distal from the chuck. Reducing the wobble and eccentric rotations enables the cutting chips to last longer and less breakage is sustained by the cutter chips. The centrically guidance of the device is achieved by the dynamics of the live center device 80 during rotation similar to hydraulics of the oil fluid both that motivates bar stock centrically of an apparent eccentricities in rotation that otherwise would avail and occur at rest and slow rotation states.

Operation of the live center device 80 to prevent wobble is as follows: The bar stock 14 is placed with one end extending in the cup end 82 and the other end of the rod extending through the chuck as is well known in the art. The cylinder rod 54 is moved hydraulically to move the bar stock rod 14 to the stop position in the lathe. The pressure on the end of the rod 14 against the stop (not shown) is counter to the movement of the cylinder rod 54 which forces the live center cup 108 toward the live center sleeve 100. The live center sleeve 100 and live center cup 108 are forced with their sloped surfaces 102 and 110 relative to the sloped ends 103 of the ring 112. The sloped surfaces cause the live center sleeve 100 and end cup 108 to be locked to the ring 112 so that the live center sleeve 100 will rotate with the end cup 108 at such time the chuck is rotated to rotate the bar stock rod. The pressure on the live center sleeve 100 and the end cup 108 relative to the ring 112 centers the bar stock rod to avoid wobble. The ends of the ring 112 expand to an extent that they will lock against the rotatable retainer shield 88 in one position or the rotatable bar stock tube once the bar feed mechanism has been moved to the confines of the bar stock tube. When the work function on the bar stock has been completed and the chuck opens, the pressure on the bar stock 14 is relieved and the ring 112 then forces the live center ring 100 and end cup 108 axially so that the rod can be moved again to the lathe stop for its next operation.

Figure 5:
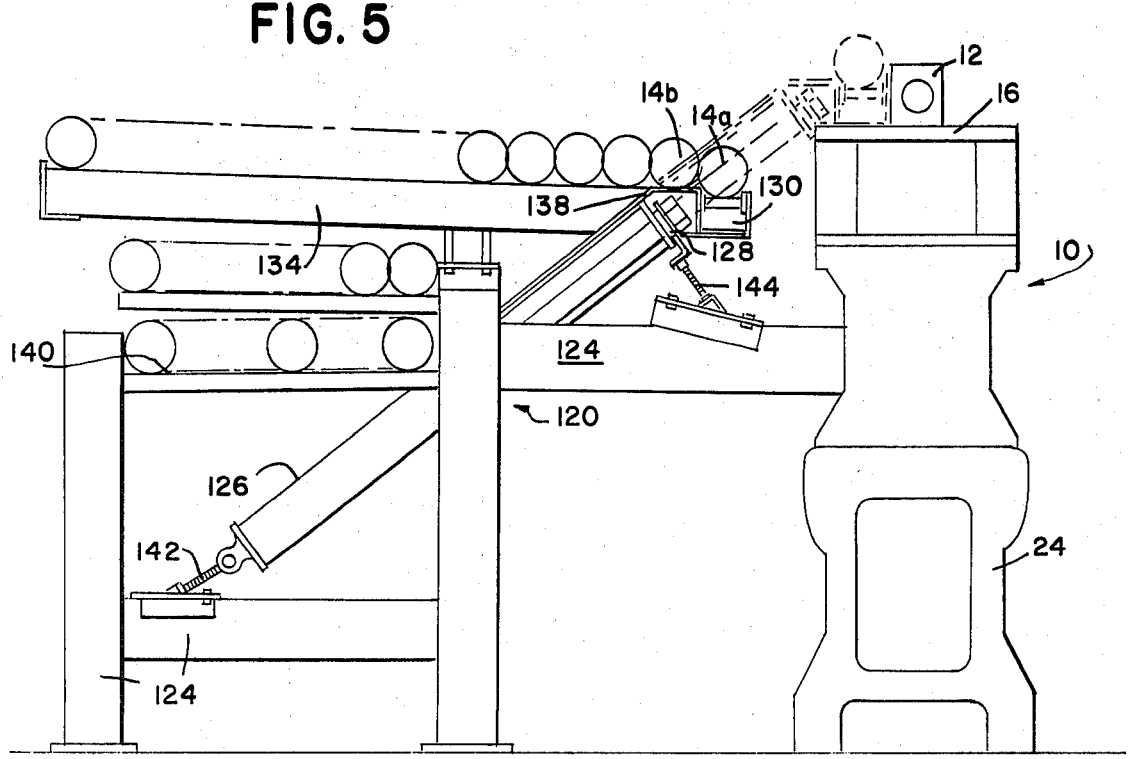
FIG. 5 is a front elevation view of a bar stock storage and feed apparatus for lifting individual bar stock into the work position of FIG. 1 and replacement of used bar stock thereof.
Figure 6:
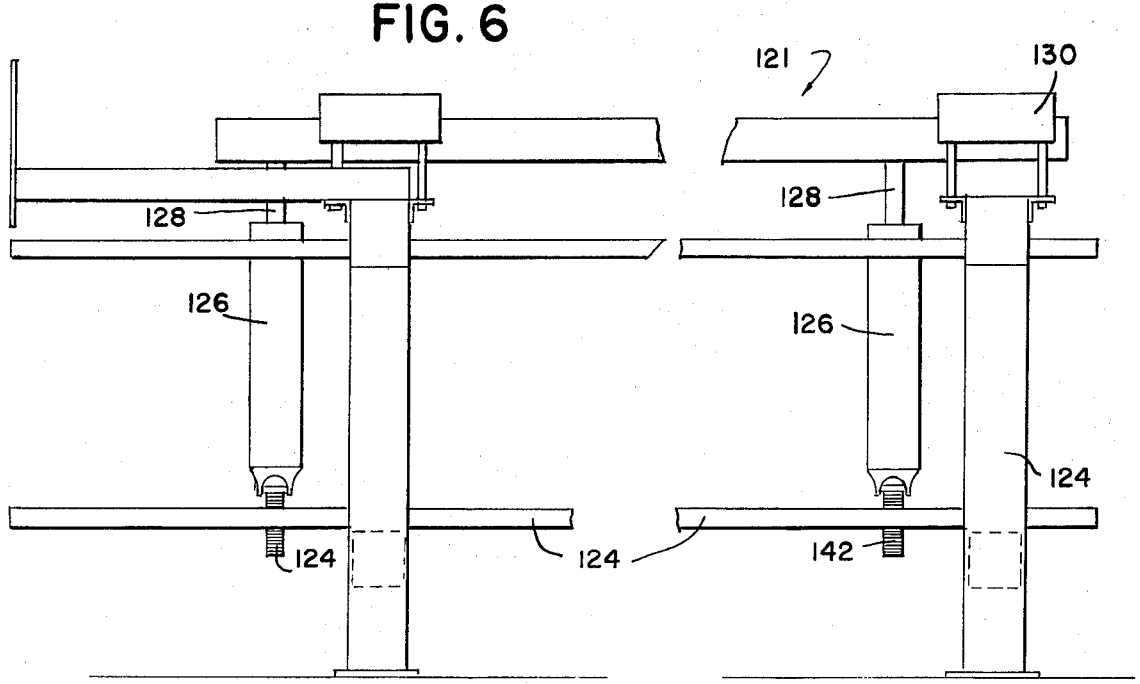
FIG. 6 is a left side view of merely the bar stock storage and feed apparatus without showing the hydraulic system.

Behind the apparatus 10 there is shown in FIGS. 1, 5 and 6 a hydraulic carriage loader 121 including a frame 124 supporting at an angular orientation a pair of hydraulic cylinders 126, 126 having a piston (not shown) and piston rods 128, 128. A hydraulic control valve 72 with detent 74 supplies fluid from a flow divider 76 which allows the cylinders 126 to operate together. At the upper end of the rods 128, 128 there is a trough member 130, 130 which is connected to both cylinders for taking a bar stock 14a from a storage track 134 and lifting it as needed into position which will extend outwardly to the correct alignment for insertion into the apparatus 10 such as that of bar stock 14. When stock 14a is in place securely, then the trough is lowered again into its initial position, edge 138 (FIG. 5) then allowing replacement of bar stock 14a with bar stock 14b. This process continues as each bar stock is worked into finished pieces of final work product.

Of course additional bar storage spacing and shelving is made available in additional bar storage area 140. Adjustment of the cylinders 126, 126 is accomplished by manually adjusting the adjustment members 142, 142, 144, 144.

Full storage of bar stock in the area lends stability and alternate vibration of this apparatus of the carriage bed 16 and the apparatus 10. Use of this invention shown and described reduces and tends to eliminate vibrations, whiplash and other mechanical eccentric or other movements, which in turn tends to eliminate or substantially reduce the breakage of metallic or ceramic cutting chip or element (not shown) in the machine lathe 22.

It is within the provisions of the invention that produces a common result of the invention to use a hard silicon rubber or urethane material resilient in nature in lieu of a metal sleeve or tube 88, or other sleeve and hollow tube elements or members. Of course it is within the provisions of the invention to provide an OSHA cover that encompasses the rotational members of the live center device 80, sleeves, live center sleeve 100 and others.

It is seen that a new and improved centrically operated live center and support system for long elements of bar stock applications is provided by the teaching of the present invention.

It is within the provisions of the application to provide a semi-cylindrical cover mechanism hingedly disposed generally coaxial of the central rod 54, bar stock 14 and as is shown in P. DUCANIS U.S. Pat. No. 4,030,585 which is preferably of transparent plastic, such as "PLEXIGLAS", and of course, may extend over the length of the apparatus. The entire disclosure of DUNCANIS for this feature in incorporated herein by reference.

It is seen that by the method and apparatus of the present invention the guide and tensioning arrangement 88, 100, 108, 112 provides for damping noise, reducing sliding friction between elements of said arrangement for high rpm's and for providing a float effect of the characteristics of the inertia, mass and other component elements of the arrangement, particularly due to the wedge element or surfaces and the expansible member 112.

Additional embodiments of the invention in this specification will occur to others and therefore it is intended that the scope of the invention be limited only by the appended claims and not by the embodiments described herein above. Accordingly, reference should be made to the following claims in determining the full scope of the invention.

What is claimed and desired to be secured by United States Letters Patent is:

1. A bar feed centrically guiding device for a lathe comprising a movable support shaft having a flange element proximate to a free end thereof and having means for receiving bar stock at an opposite end, a plurality of sleeve members each of hollow cylindrical configuration disposed coaxially on said support shaft by intermediate ball bearing means, said sleeve members each having a sloped surface on the outer cylindrical configuration thereof, with the sloped surface of each sleeve member sloped toward each other, and an expansible hollow cylindrical ring member having at each end thereof an inwardly sloped surface for cooperatively mating with the sloped surface on the outer cylindrical configuration of said sleeve members and surrounding and engagingly mating therewith, and an outer hollow rotatable cylinder exterior of said expansible hollow cylindrical ring member being fixedly retained in position upon any expansion of the expansible hollow cylindrical ring member for rotation therewith.

2. The invention of claim 1 wherein said expansible hollow cylindrical ring member is an endless Z-shaped element.

3. The invention of claim 1 wherein said expansible hollow cylindrical ring member is of plastic consisting essentially of a material selected from the group of silicone rubber and urethane materials.

4. The invention of claim 1 wherein said axially movable support shaft is moved in response to a hydraulic cylinder-piston and rod system.

5. The invention of claim 1 wherein said sleeve members, said expansible hollow cylindrical ring member and said outer hollow cylinder comprise an adjustably corrective compensating means for eccentrically aligning a distal end of rotatingly driven bar stock.

6. The invention of claim 1 wherein said sleeve members, said expansible hollow cylindrical ring member and said outer hollow cylinder comprise a centrically guided live center means auxiliary to a female live center supporting said distal end of said bar stock.

7. The invention of claim 1 wherein a hydraulic carriage loader for on-loading bar stock to the lathe is provided with a set of hydraulic cylinders and rods for raising an end bar stock into a work position and insertion into an aligning condition on said lathe.

8. The invention of claim 7 wherein said loader with its storage of available bar stock provides stability to the lathe and its accompanying apparatus.

* * * * *